Nov. 15, 1938.　　　　P. R. BAIRD　　　　2,136,834
TRACTOR HITCH
Filed May 3, 1938　　　　4 Sheets-Sheet 3
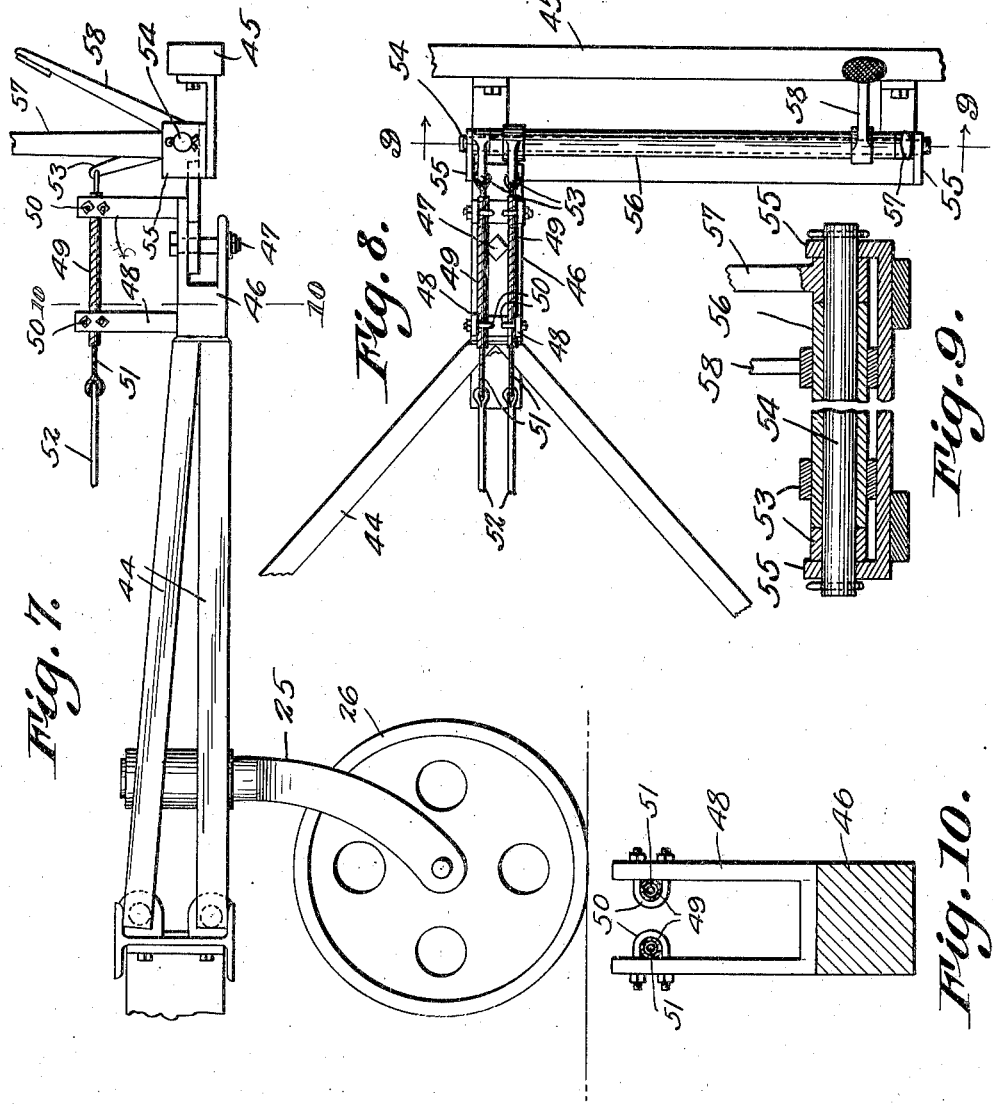
Paul R. Baird
INVENTOR.
BY C. A. Snow & Co.
ATTORNEYS.

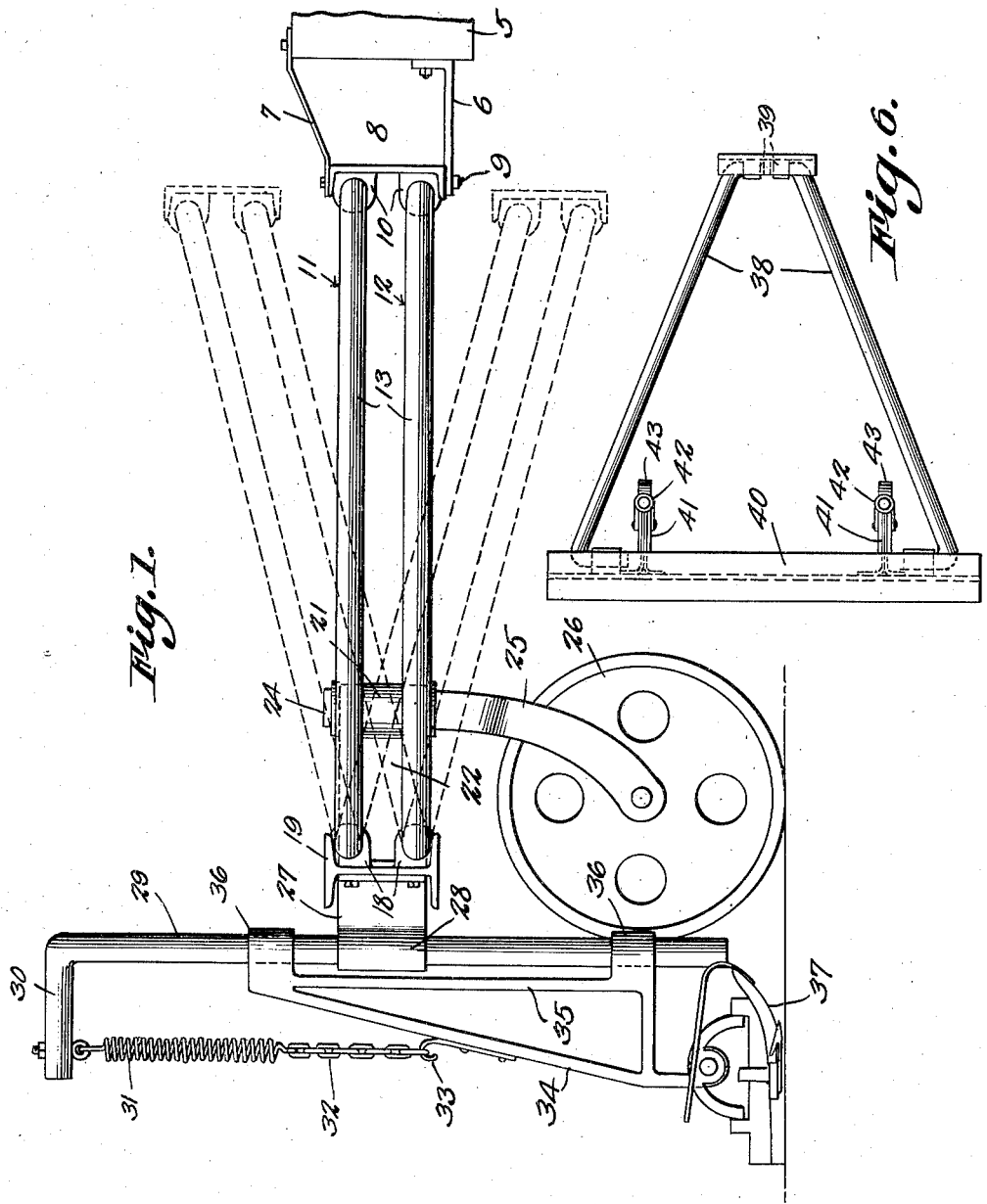

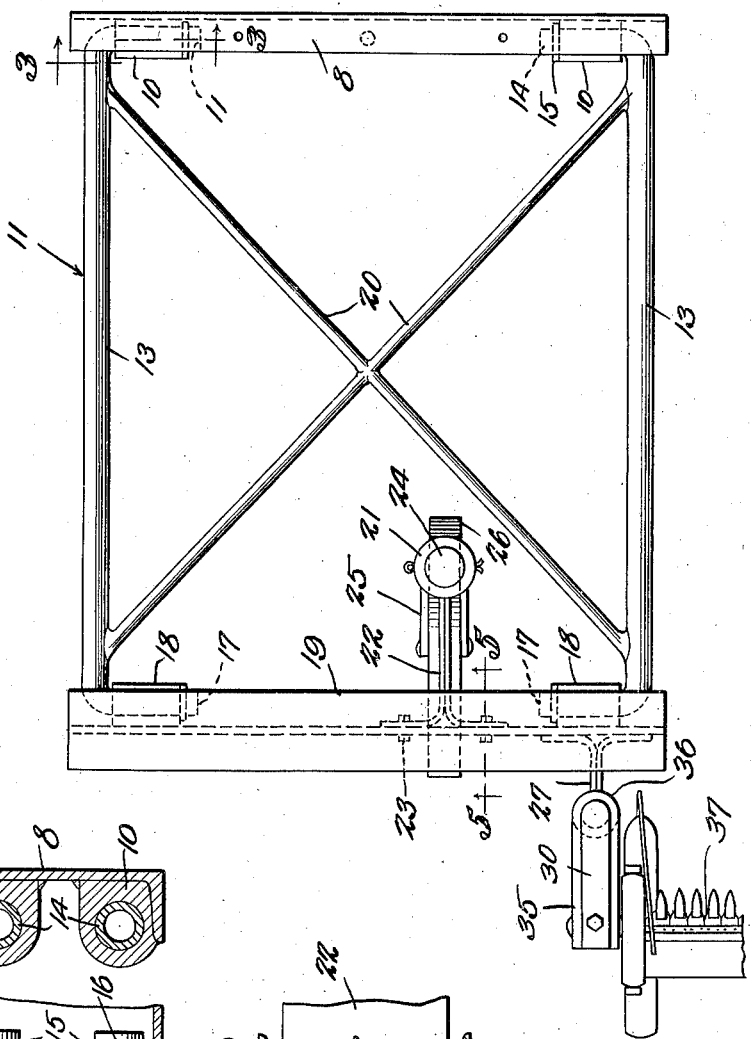

Nov. 15, 1938.   P. R. BAIRD   2,136,834
TRACTOR HITCH
Filed May 3, 1938   4 Sheets-Sheet 4

Paul R. Baird
INVENTOR.

BY C. A. Snow & Co.
ATTORNEYS.

Patented Nov. 15, 1938

2,136,834

UNITED STATES PATENT OFFICE 2,136,834

TRACTOR HITCH

Paul R. Baird, Blythe, Calif.

Application May 3, 1938, Serial No. 205,843

4 Claims. (Cl. 56—25)

This invention relates to tractor hitches, the primary object of the invention being to provide an exceptionally flexible hitch including a frame which will permit of free vertical movement of the tractor or machine pulled by the tractor, with respect to each other, but one which will be securely braced against side sway or lateral strains.

Another object of the invention is to provide yieldable means for cushioning the vertical movements of a mowing machine connected with the hitch, said yieldable means adapted to also lift the cutter bar of the mowing machine over irregularities in the surface over which the device is moving.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view illustrating a hitch constructed in accordance with the invention as connected with a tractor draw bar.

Figure 2 is a plan view thereof.

Figure 3 is a sectional view taken on line 3—3 of Figure 2.

Figure 4 is a sectional view taken on line 4—4 of Figure 3.

Figure 5 is a sectional view taken on line 5—5 of Figure 2.

Figure 6 is a plan view of a modified form of the invention.

Figure 7 is an elevational view of a further modified form of the invention.

Figure 8 is a fragmental plan view thereof.

Figure 9 is a sectional view taken on line 9—9 of Figure 8.

Figure 10 is an elevational view of a still further modified form of hitch.

Figure 11:
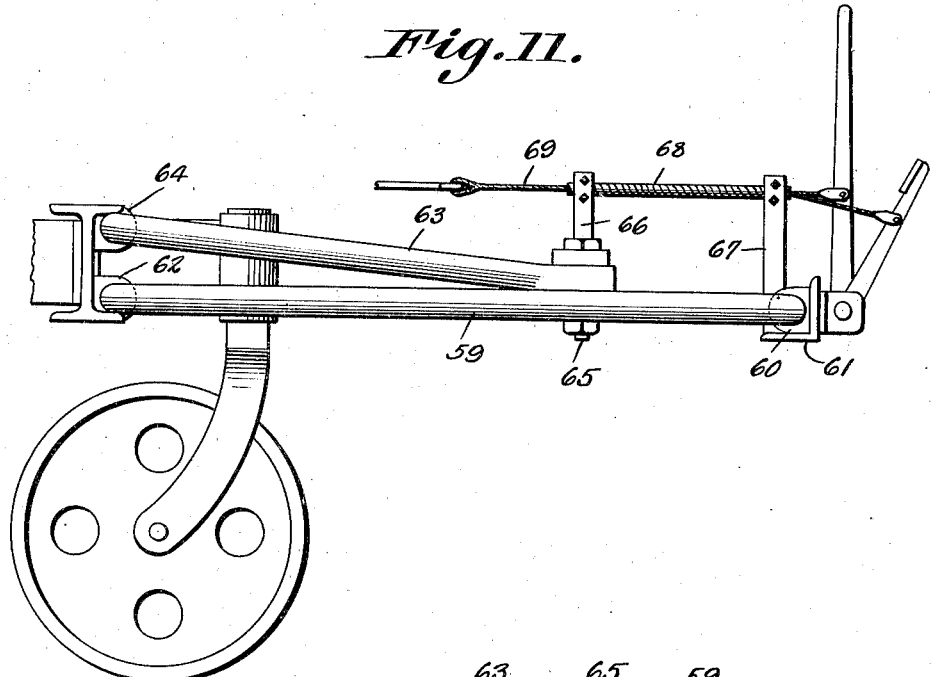
Figure 11 is a side elevational view of another form of the invention.
Figure 12:
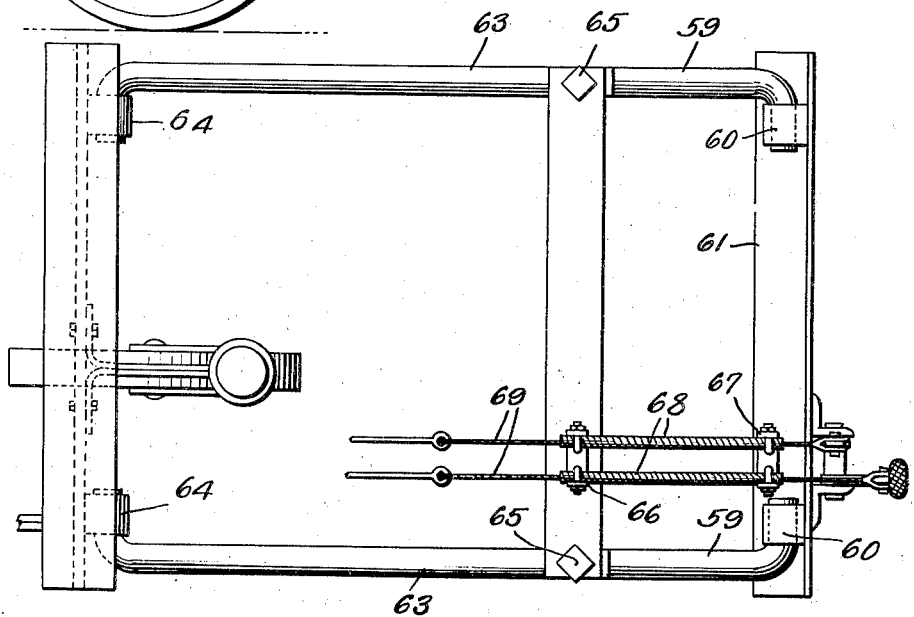
Figure 12 is a plan view thereof.

Referring to the drawings in detail, the reference character 5 designates the draw bar of the usual tractor. Connected with the draw bar 5, is a lower brace arm 6, and an upper brace arm 7, the arms 6 and 7 being pivotally connected to the channel bar 8, as by means of the bolts 9.

Secured to the open side of the channel bar 8, as by welding, are bearings 10 arranged in pairs at each end of the channel bar 8. The main portion of the tractor hitch, includes an upper frame 11 and lower frame 12, each frame including side rods 13 having inwardly extended ends 14 fitted in the bearings 10, and held in position by means of the washers 15 and keys 16 that extend through openings in the inwardly extended ends 14. The opposite ends of the side rods 13 are extended inwardly as at 17 and are fitted in bearings 18 that are also arranged in pairs adjacent to the ends of the bar 19. These side rods 13 are connected by the angular connecting rods 20, that connect with the rods 13 at points near the ends thereof, the connecting rods 20 being secured together at points intermediate the ends thereof.

The reference character 21 designates a bearing that is supported at the inner end of the bearing supporting arm 22 that in turn is bolted to the bar 19, as by means of bolts 23. The bearing 21 accommodates the shaft 24 disposed at the upper end of the fork 25 in which the wheel 26 operates. Thus it will be seen that while the tractor hitch has pivotal connection with the tractor and machine drawn by the tractor, the weight of the hitch, and forward end of the machine drawn by the tractor, is supported by the wheel 26.

Secured adjacent to one end of the bar 19, and extending rearwardly therefrom, is a bracket 27 which is formed with a head 28 in which the vertical rod 29 is secured, as by welding. The upper end of the rod 29 extends rearwardly as at 30, where it provides a support for the upper end of the coiled spring 31, the opposite end of the spring 31 having connection with the chain 32. The chain 32 has its lowermost link positioned over the hook 33 that is secured to the bar 34 of the frame 35. The frame 35 is formed with bearings 36 at its upper and lower ends, which bearings accommodate the vertical rod 29 to allow pivotal movement of the frame 35, with respect to the rod 29. It will also be seen that due to this construction, the frame 35 may move vertically on the rod 29 to elevate the mower or machine connected with the frame 35.

In the present showing, a bore is indicated by the reference character 37.

In the form of the invention as illustrated by Figure 6 of the drawings, the tractor hitch includes upper and lower sections, the side rails 38 thereof being extended inwardly where they are formed with right-angled ends fitted in bearings formed in the bar 39. The opposite ends of the rails 38 are connected with the bar 40 which is substantially long, as compared with the bar 39. The bar 40 provides a support for the brackets 41 that are provided with bearings 42, in which the vertical shafts of the wheels 43 are mounted. In connection with the modification, it might be stated that this form of tractor hitch is especially desirable for use in drawing sub-soilers, cultivators or similar farm machinery.

In the form of the invention as shown by Sheet 3 of the drawings, the frames of the tractor hitch, are indicated by the reference character 44 which are connected to the draw bar 45 of the tractor, by means of the clevis 46 and bolt 47. Secured to the clevis 46, are upstanding arms 48 to which the flexible tubular guides 49 are secured as by means of the U-shaped bolts 50. These guides 49, support the cables 51, which have connection with the control rods 52, the opposite ends of the cables being connected with the arms 53. One of the arms 53 is secured to the shaft 54 that has its ends mounted in bearings 55, the opposite arm 53 being secured to the tubular shaft 56, in which the shaft 54 is mounted. This shaft 54 is operated by the hand lever 57 that is secured to the shaft 54 near one end thereof. Foot lever 58 is connected with the tubular shaft 56 to operate the tubular shaft and cable connected therewith.

From the foregoing it will be seen that due to the construction shown and described, the tractor or machine drawn by the tractor, may move readily with respect to each other, in a vertical direction, but will be rigidly braced against lateral strains.

It might be further stated that due to the construction the spring 31 will act to elevate the frame 35, when the tractor or machine drawn thereby is moving over irregularities such as ditches, gullies, terraces or the like, and that due to the construction of the control mechanism, the tractor may be readily turned or guided, without danger of the control mechanism binding.

In the form of the invention as shown by Figure 10 of the drawings, the upper frame 58' of the hitch is bolted to the lower frame 59, at 60.

As shown by Sheet 4 of the drawings, the frame is substantially rectangular in formation and includes side rods 59 having right angled end portions fitted in bearings 60 formed on the angle bar 61, the opposite ends of said side rods being pivotally mounted in bearings 62 carried by the I-beam to which the frame is connected. The frame also includes an upper U-shaped section embodying rods 63 having right angled outer ends pivotally held in brackets 64, the rear ends of these rods being bolted to the bars 63 at 65.

Brackets 66 and 67 are mounted on the frame and provide supports for the tubular guides 68 through which the cables 69 operate.

I claim:

1. A tractor hitch comprising a frame including spaced upper and lower side rods having inwardly extended ends, a bar adapted to be secured to the tractor, a bar adapted to be secured to the machine pulled by the tractor, pairs of spaced upper and lower bearings in which the inwardly extended ends of the side rods are pivotally mounted, a supporting arm extending inwardly from one of the bars and having a bearing, a supporting wheel having a shaft fitted within the latter bearing, and a frame supported by one of the bars and providing a connecting means to connect the tractor hitch with the machine being pulled.

2. A tractor hitch comprising a frame including spaced upper and lower side rods having inwardly extended ends, a bar adapted to be connected with a tractor, a bar adapted to be connected with the machine being pulled, bearings on the bars and in which the inwardly extended ends of the side rods are pivotally held, a bracket extending from one of the bars, a vertical rod secured to the bracket, a frame mounted for vertical sliding movement on said vertical rod, and adapted to support a machine at the lower end thereof, and yieldable means for restricting vertical movement of the frame over the vertical rod.

3. A tractor hitch comprising a frame including spaced side rods, a bar adapted to be secured to a tractor, a bar adapted to be secured to the machine pulled by the tractor, means for pivotally connecting the ends of the rods to the bars, a bracket extending from one of the bars, a vertical rod connected with the bracket, a frame having bearings for the reception of said vertical rod, a coiled spring connected with said rod and having connection with the latter frame whereby vertical movement of the latter frame is restricted, and said latter frame adapted to be connected directly with the machine being pulled by the tractor.

4. A tractor hitch comprising a frame, including spaced upper and lower side rods, a bar adapted to be connected with a tractor, a bar adapted to be connected with the machine being pulled, bearings on said bars, the ends of said rods being pivotally held within the bearings, a bracket extending from one of the bars, a vertical rod secured within the bracket, the upper end of said rod extending laterally, a coiled spring secured to the right-angled end of said vertical rod, a frame adapted to be secured to the machine being pulled, and movable over the vertical rod, said coiled spring being connected with the latter frame, and said spring adapted to regulate vertical movement of the latter frame.

PAUL R. BAIRD.